United States Patent
Nier (10) Patent No.: US 12,091,834 B2
(45) Date of Patent: Sep. 17, 2024

(54) CONVERTIBLE BOX BLADE SCRAPER APPARATUS

(71) Applicant: Amerequip Corporation, Kiel, WI (US)

(72) Inventor: Mark J. Nier, Kiel, WI (US)

(73) Assignee: Amerequip, LLC, Kiel, WI (US)

( * ) Notice: Subject to any disclaimer, the term of this patent is extended or adjusted under 35 U.S.C. 154(b) by 753 days.

(21) Appl. No.: 17/303,299

(22) Filed: May 26, 2021

(65) Prior Publication Data

US 2022/0381002 A1    Dec. 1, 2022

(51) Int. Cl.
*E02F 3/80*      (2006.01)
*E02F 3/76*      (2006.01)

(52) U.S. Cl.
CPC .............. *E02F 3/80* (2013.01); *E02F 3/7622* (2013.01)

(58) Field of Classification Search
CPC ......... E03F 3/80; E03F 3/7622; E03F 3/7604; E03F 3/4622; A01B 31/00
USPC ................................ 172/197, 198, 199, 200
See application file for complete search history.

(56) References Cited

U.S. PATENT DOCUMENTS

| | | | | | |
|---|---|---|---|---|---|
| 2,566,562 A | * | 9/1951 | Hale | ...................... | E02F 3/8152 |
| | | | | | 172/197 |
| 2,774,155 A | * | 12/1956 | Hipp | ...................... | E02F 3/8152 |
| | | | | | 172/197 |
| 2,839,851 A | * | 6/1958 | Geiszler | ................ | E02F 3/7604 |
| | | | | | 172/197 |
| 2,840,933 A | * | 7/1958 | Brem | ..................... | E02F 3/7622 |
| | | | | | 172/197 |
| 2,840,935 A | * | 7/1958 | Bird | ....................... | E02F 3/8155 |
| | | | | | 172/197 |
| 2,897,615 A | * | 8/1959 | Hills | ...................... | E02F 3/8152 |
| | | | | | 172/197 |
| 3,034,238 A | * | 5/1962 | McGee | .................. | A01B 35/00 |
| | | | | | 172/197 |
| 3,058,243 A | * | 10/1962 | McGee | ................. | E02F 3/8155 |
| | | | | | 172/197 |

(Continued)

FOREIGN PATENT DOCUMENTS

| CA | 2601210 | | 4/2009 | | |
|---|---|---|---|---|---|
| CA | 2601210 A1 | * | 4/2009 | ............. | A01B 31/00 |

*Primary Examiner* — Jamie L McGowan
(74) *Attorney, Agent, or Firm* — James A. Joyce; Godfrey & Kahn, S.C.

(57) ABSTRACT

A convertible box blade scraper apparatus includes a frame assembly including a first sidewall, a second sidewall, one or more shank support cross-members, a first blade support cross-member having a first scraper blade secured thereto, a second blade support cross-member extending between and secured to the first sidewall and the second sidewall, and having a second scraper blade and a leveling blade secured thereto, and a moldboard support cross-member, the moldboard support cross-member having a moldboard support longitudinal center axis. The apparatus further includes an elongated moldboard having an arc-shaped front surface that extends between a moldboard top edge and a moldboard bottom edge, the moldboard including one or more pivot arms rotatably coupled to the moldboard support cross-member to provide the moldboard with a pivot axis, wherein the pivot axis is coincident with the moldboard support longitudinal center axis, and further including a hitch assembly.

13 Claims, 11 Drawing Sheets

(56) References Cited

U.S. PATENT DOCUMENTS

| | | | | |
|---|---|---|---|---|
| 3,069,791 A * | 12/1962 | French | E02F 3/8155 | 172/197 |
| 3,097,004 A * | 7/1963 | Wenzel | E02F 3/8152 | 172/744 |
| 3,213,554 A * | 10/1965 | Dalton | E02F 3/7604 | 172/197 |
| 3,311,175 A * | 3/1967 | Richey | E02F 3/7604 | 172/197 |
| 3,430,703 A * | 3/1969 | Richey | E02F 3/8155 | 172/197 |
| 3,448,814 A * | 6/1969 | Jackson | A01B 49/027 | 172/170 |
| 3,470,964 A * | 10/1969 | Collins | A01B 31/00 | 172/197 |
| 3,834,465 A * | 9/1974 | Collins | A01B 49/02 | 172/197 |
| 3,876,013 A * | 4/1975 | Dunn | A01B 31/00 | 172/170 |
| 4,044,843 A * | 8/1977 | Holub | E02F 3/401 | 172/810 |
| 4,196,778 A * | 4/1980 | Smith | E02F 3/7622 | 172/451 |
| 4,217,962 A * | 8/1980 | Schaefer | E02F 3/6454 | 172/197 |
| 4,389,800 A * | 6/1983 | Goby | E02F 3/651 | 37/415 |
| 4,524,532 A * | 6/1985 | Browning | E02F 3/6472 | 172/197 |
| 4,869,326 A * | 9/1989 | Hutchins | E02F 3/7631 | 172/197 |
| 5,024,280 A * | 6/1991 | Mork | E02F 3/7622 | 172/197 |
| 5,074,061 A * | 12/1991 | Thompson | E02F 3/65 | 172/197 |
| 5,769,171 A * | 6/1998 | Newman, IV | A01B 31/00 | 172/199 |
| 5,771,980 A * | 6/1998 | Mork | E02F 3/7604 | 172/449 |
| 5,911,279 A * | 6/1999 | Whitener | A01B 63/10 | 172/668 |
| 7,575,067 B1 * | 8/2009 | Reyes | E02F 3/961 | 172/684.5 |
| 7,584,805 B2 | 9/2009 | Skaggs | | |
| 8,657,024 B2 * | 2/2014 | Fraley | A01B 31/00 | 172/196 |
| 8,813,864 B2 | 8/2014 | Layton | | |
| 10,584,464 B2 | 3/2020 | Armstrong | | |
| 10,704,224 B1 * | 7/2020 | Hauer | E02F 9/2271 | |
| 2007/0289757 A1 | 12/2007 | Wells | | |
| 2011/0297405 A1 * | 12/2011 | Fraley | E02F 3/7622 | 172/684.5 |
| 2012/0048579 A1 * | 3/2012 | Davis | A01B 49/027 | 172/200 |
| 2022/0267986 A1 * | 8/2022 | Corriher | A01B 35/14 | |
| 2022/0381002 A1 * | 12/2022 | Nier | E02F 3/7622 | |

* cited by examiner

CONVERTIBLE BOX BLADE SCRAPER APPARATUS

FIELD OF THE INVENTION

The invention relates generally to agricultural devices and more particularly to box blades and grading scrapers.

BACKGROUND OF THE INVENTION

Various types of box blades are known for cutting and moving material such as soil. In addition, various types of grading scrapers are known for surface leveling of various materials, such as soil. Each device has a limited design for its specific task and it is common for a user of a utility vehicle to utilize a box blade to cut and move materials, followed by a grading scraper to level the materials. Unfortunately, such use requires a user to purchase and store both devices, then connect and disconnect each device before and after each use. In addition existing grading scrapers and box blades are limited in their ability to effectively recirculate and churn materials.

BRIEF SUMMARY OF THE INVENTION

In at least some embodiments, the invention relates to a convertible box blade scraper apparatus comprising: a frame assembly having a front portion and a rear portion, the frame assembly comprising: a first sidewall; a second sidewall; one or more shank support cross-members extending between and secured to the first sidewall and second sidewall; a first blade support cross-member extending between and secured to the first sidewall and the second sidewall, and having a first scraper blade secured thereto; a second blade support cross-member extending between and secured to the first sidewall and the second sidewall, and having a second scraper blade and a leveling blade secured thereto; a moldboard support cross-member extending between and secured to the first sidewall and the second sidewall, the moldboard support cross-member having a moldboard support longitudinal center axis; the convertible box blade scraper apparatus further comprising an elongated moldboard having an arc-shaped front surface that extends between a moldboard top edge and a moldboard bottom edge, the moldboard situated between the first sidewall and the second sidewall and including one or more pivot arms, the pivot arms rotatably coupled to the moldboard support cross-member to provide the moldboard with a pivot axis, wherein the pivot axis is coincident with the moldboard support longitudinal center axis; and a hitch assembly secured to the frame assembly.

Other embodiments, aspects, and features of the invention will be understood and appreciated upon a full reading of the detailed description and the claims that follow.

BRIEF DESCRIPTION OF THE DRAWINGS

Embodiments of the invention are disclosed with reference to the accompanying drawings and are for illustrative purposes only. The invention is not limited in its application to the details of construction or the arrangement of the components illustrated in the drawings. The invention is capable of other embodiments or of being practiced or carried out in other various ways. In the drawings.

DETAILED DESCRIPTION

Referring to FIGS. 1-8, an exemplary embodiment of a convertible box blade scraper apparatus 6 is shown in various views. The apparatus 6 includes a front portion 8 and a rear portion 10 opposite the front portion 8. The apparatus 6 includes a frame assembly 12. In at least some embodiments, the frame assembly 12 includes a first sidewall 14, a second sidewall 16, one or more shank support cross-members extending between and secured to the first sidewall 14 and the second sidewall 16, and a first blade support cross-member 22 extending between and secured to the first sidewall 14 and the second sidewall 16. A first scraper blade 24 is secured to the first blade support cross-member 22 of the frame assembly 12 and faces the front portion 8 of the apparatus 6. The frame assembly 12 further includes a second blade support cross-member 26 extending between and secured to the first sidewall 14 and the second sidewall 16. A second scraper blade 28 and a leveling blade 30 are secured to the second blade support cross-member 26 of the frame assembly 12. In at least some embodiments, the second scraper blade 28 includes a second scraper blade inner curvature 29 that faces the front portion 8 of the apparatus 6 and the leveling blade includes a leveling blade inner curvature 31 that faces the rear portion of the apparatus 6.

The frame assembly 12 also includes a moldboard support cross-member 32 extending between and secured to the first sidewall 14 and the second sidewall 16, the moldboard support cross-member 32 having a moldboard support longitudinal center axis 34 extending therethrough. In at least some embodiments, the first blade support cross-member 22, second blade support cross-member 26, and the moldboard support cross-member 32 each extend perpendicularly from the first sidewall 14. In at least some embodiments, the first sidewall 14 and the second sidewall 16 are parallel to each other and perpendicular to each of the first blade support cross-member 22, second blade support cross-member 26, and moldboard support cross-member 32. In at least some embodiments, the one or more shank support cross-members include a lower shank support cross-member 18 and an upper shank support cross-member 20, wherein the lower shank support cross-member 18 is positioned underneath the upper shank support cross-member 20. The one or more shank support cross-members can be planar and/or include slots 36 that align vertically for receiving one or more shanks 38. The various components of the frame assembly 12 can be comprised of one or more of various known materials, such as metal, and can be secured together using one or more of various known fasteners, such as welding, bolts and nuts, screws, etc.

The apparatus 6 further includes a hitch assembly 40 secured to the frame assembly 12 for selectable coupling with a pulling vehicle, such as a Compact Utility Tractor (CUT). In at least some embodiments, the hitch assembly 40 is comprised of one or more coupled or otherwise interlocking supports (e.g., bars, rods, etc.) that at least in part, coverage about a hitch point 42. The hitch assembly 40 can be secured to one or more of the various components of the frame assembly 12 using one or more of various known fasteners, such as welding, bolts and nuts, screws, etc. In at least some embodiments, the hitch assembly 40 includes a pair of lower hitch legs 44 coupled with the shank support cross-members and the moldboard support cross-member 32, as well as four hitch arms 46 coupled to the lower hitch legs 44 at one end of their ends and to each other at the other of their ends about the hitch point 42.

The apparatus 6 can include the one or more shanks 38 secured to the shank support cross-members using the slots 36 to vertically position and support the shanks 38, the shanks 38 can be removable and secured using pins, bolts, etc. The shanks 38 are curved forward to break-up material as it enters the front portion 8 of the apparatus 6. The shanks 38 can include various height adjustment fastening points 48.

The apparatus 6 further includes an elongated moldboard 50. In at least some embodiments, the moldboard 50 has an arc-shaped front surface 52 and an arc-shaped rear surface 54, which both extend between a moldboard top edge 56 and a moldboard bottom edge 58. The moldboard 50 is situated between the first sidewall 14 and the second sidewall 16 and includes one or more pivot arms 60, which in at least some embodiments extend from the front surface 52 of the moldboard 50. The pivot arms 60 are rotatably coupled to the moldboard support cross-member 32 to provide the moldboard with a pivot axis 62, wherein the pivot axis 62 is coincident with the moldboard support longitudinal center axis 34. In at least some embodiments, the pivot arms 60 can each include a circular aperture 64 that encircles the moldboard support cross-member 32, allowing the moldboard to pivot with respect to the moldboard support cross-member 32, while in other embodiments, the pivot arms 60 can be varied in shape and pivotably coupled using other methods. As the pivot arms 60 extend from the front surface 52 of the moldboard 50, the front surface 52 of the moldboard 50 faces the moldboard support longitudinal center axis 34 and pivot axis 62.

The moldboard 50 is selectably pivotable between at least an up position and a down position. FIGS. 1-7 illustrate the moldboard 50 in the up position. When the moldboard 50 is in the up position, an opening, referred to herein as a material aperture 68, is provided between the moldboard bottom edge 58, a second scraper blade top edge 66 of the second scraper blade 28, the first sidewall 14, and the second sidewall 16.

Figure 1:
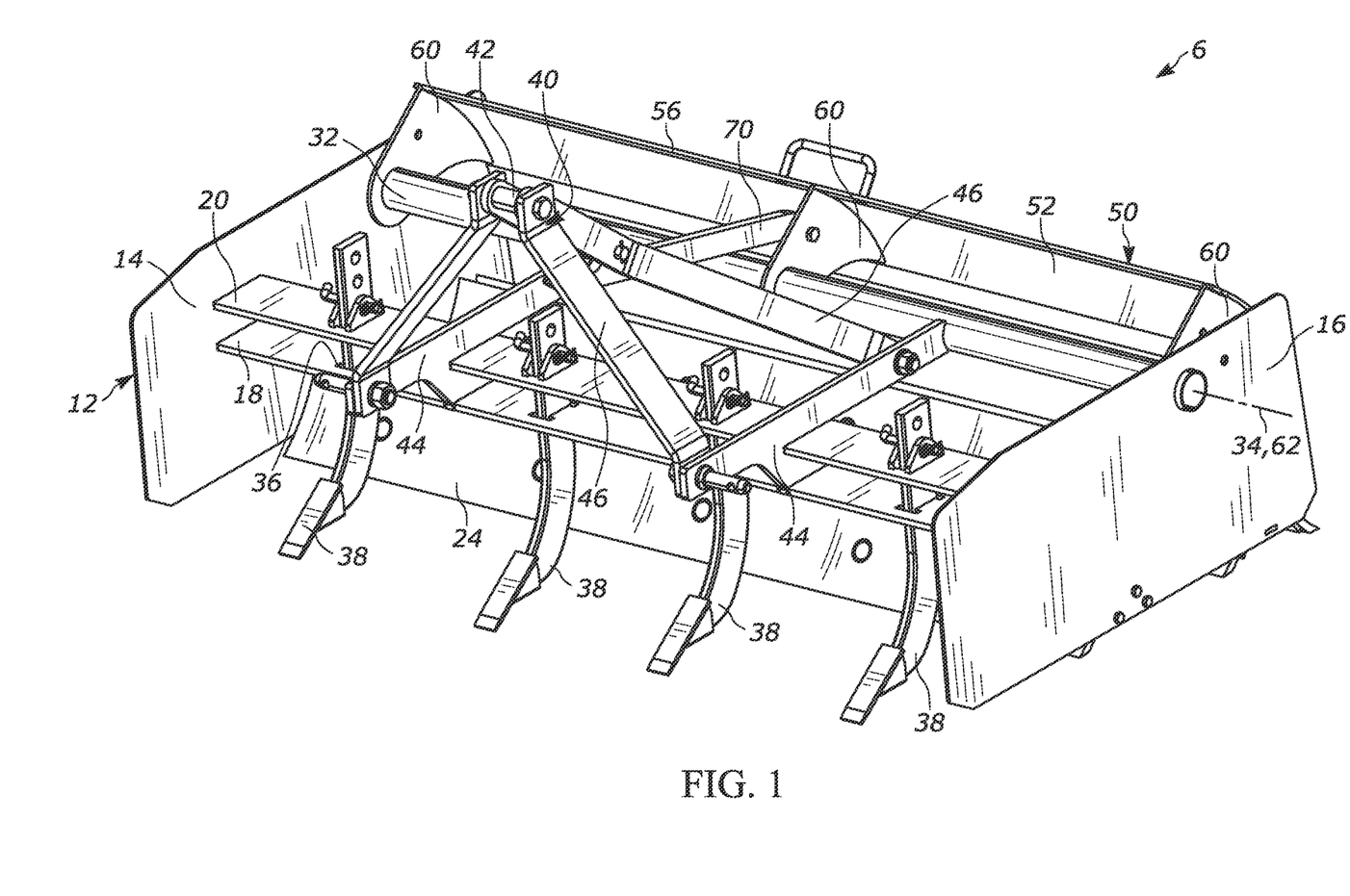
FIG. 1 is a front top perspective view of an exemplary embodiment of a convertible box blade scraper apparatus with a moldboard shown in an up position.
Figure 2:
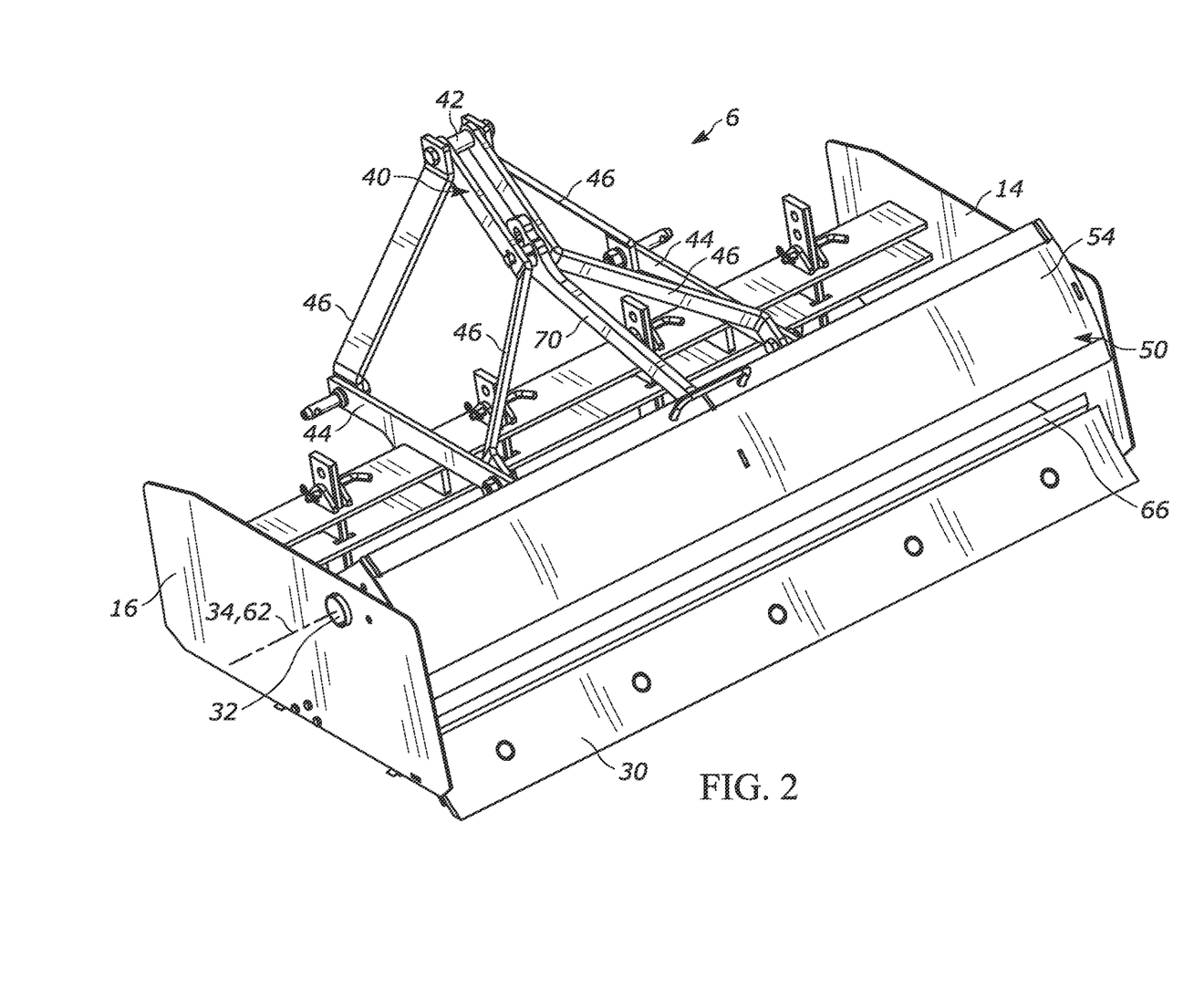
FIG. 2 is a rear top perspective view of the apparatus of FIG. 1.
Figure 3:
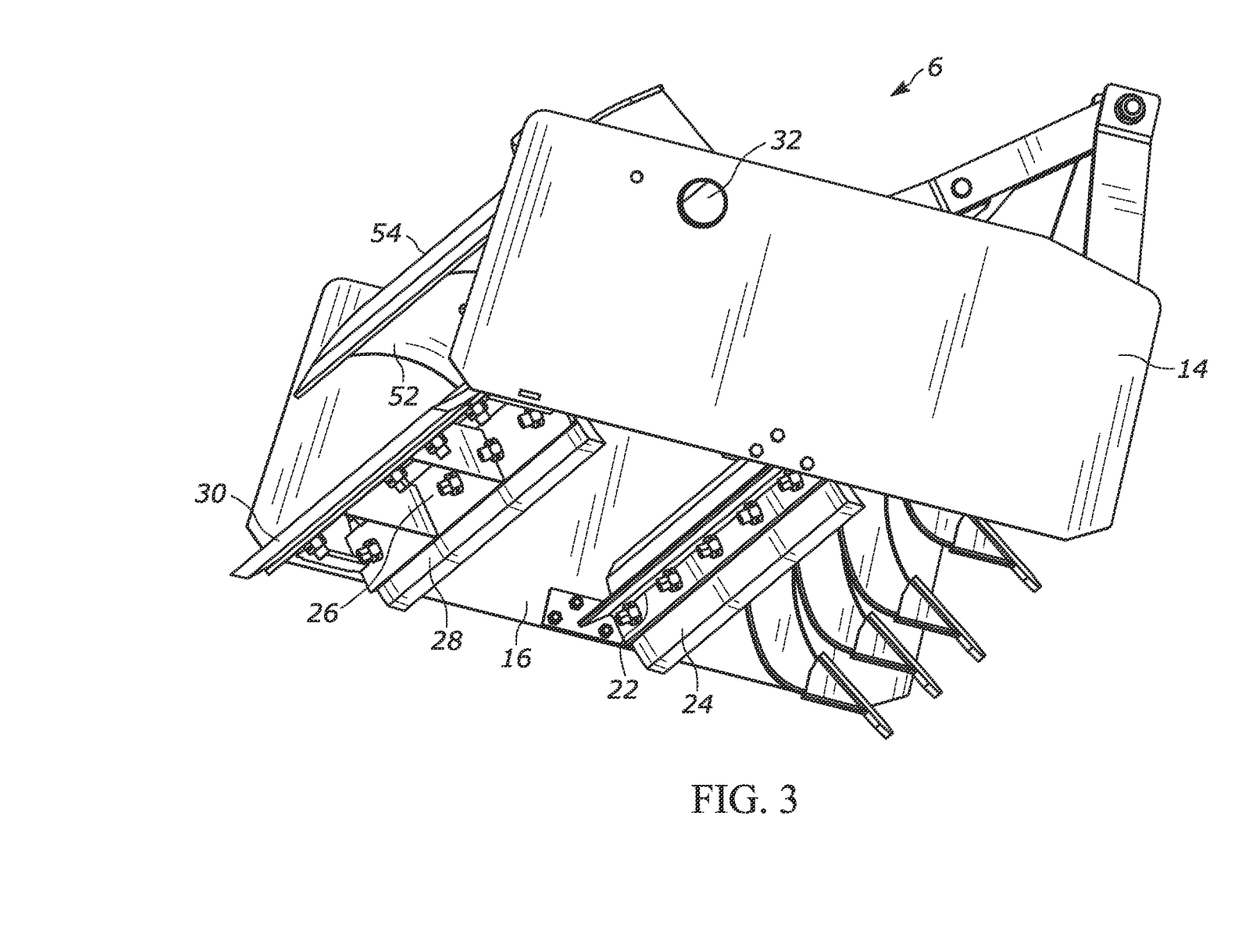
FIG. 3 is a rear bottom perspective view of the apparatus of FIG. 1.
Figure 4:
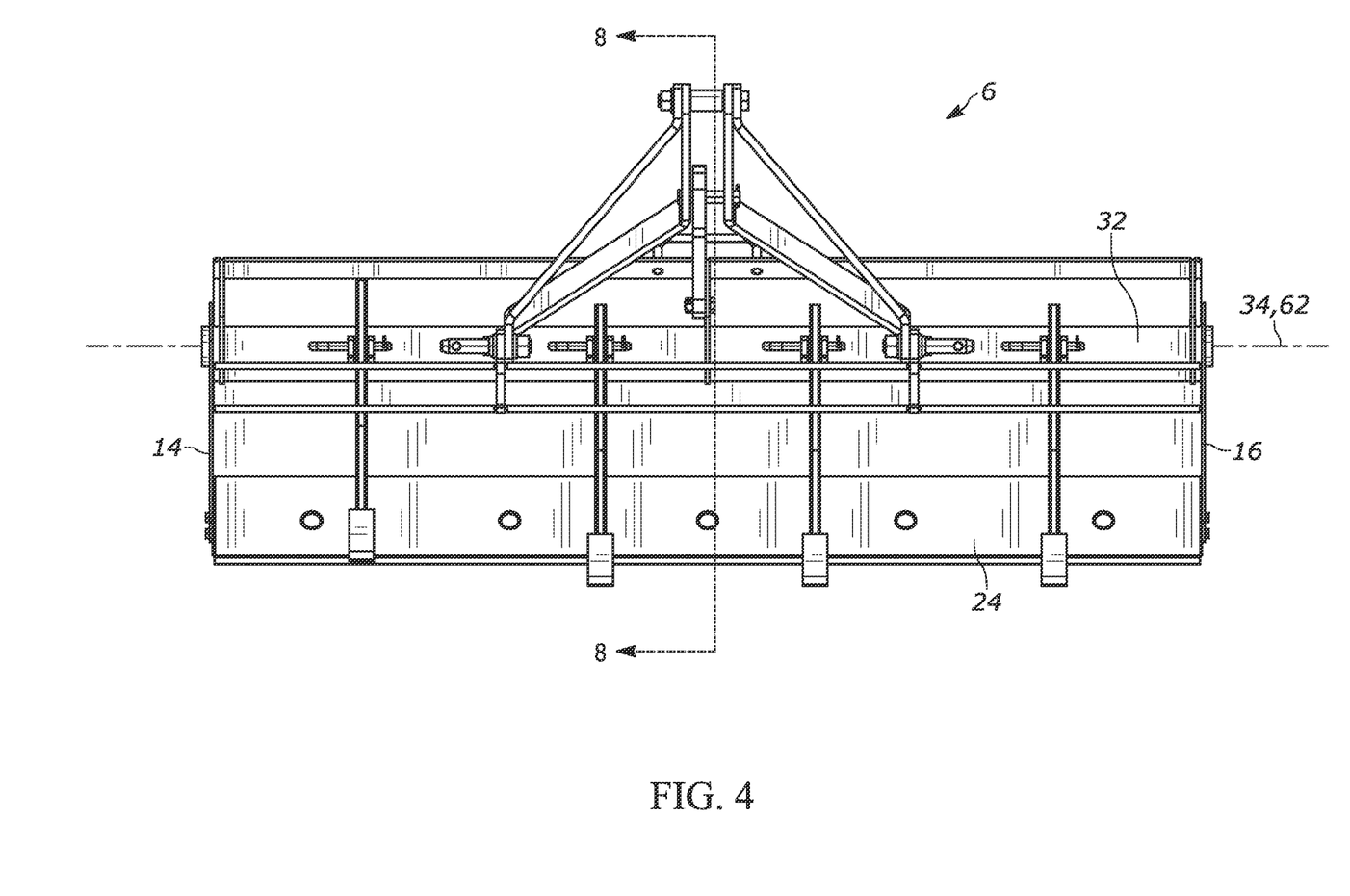
FIG. 4 is a front view of the apparatus of FIG. 1.
Figure 5:
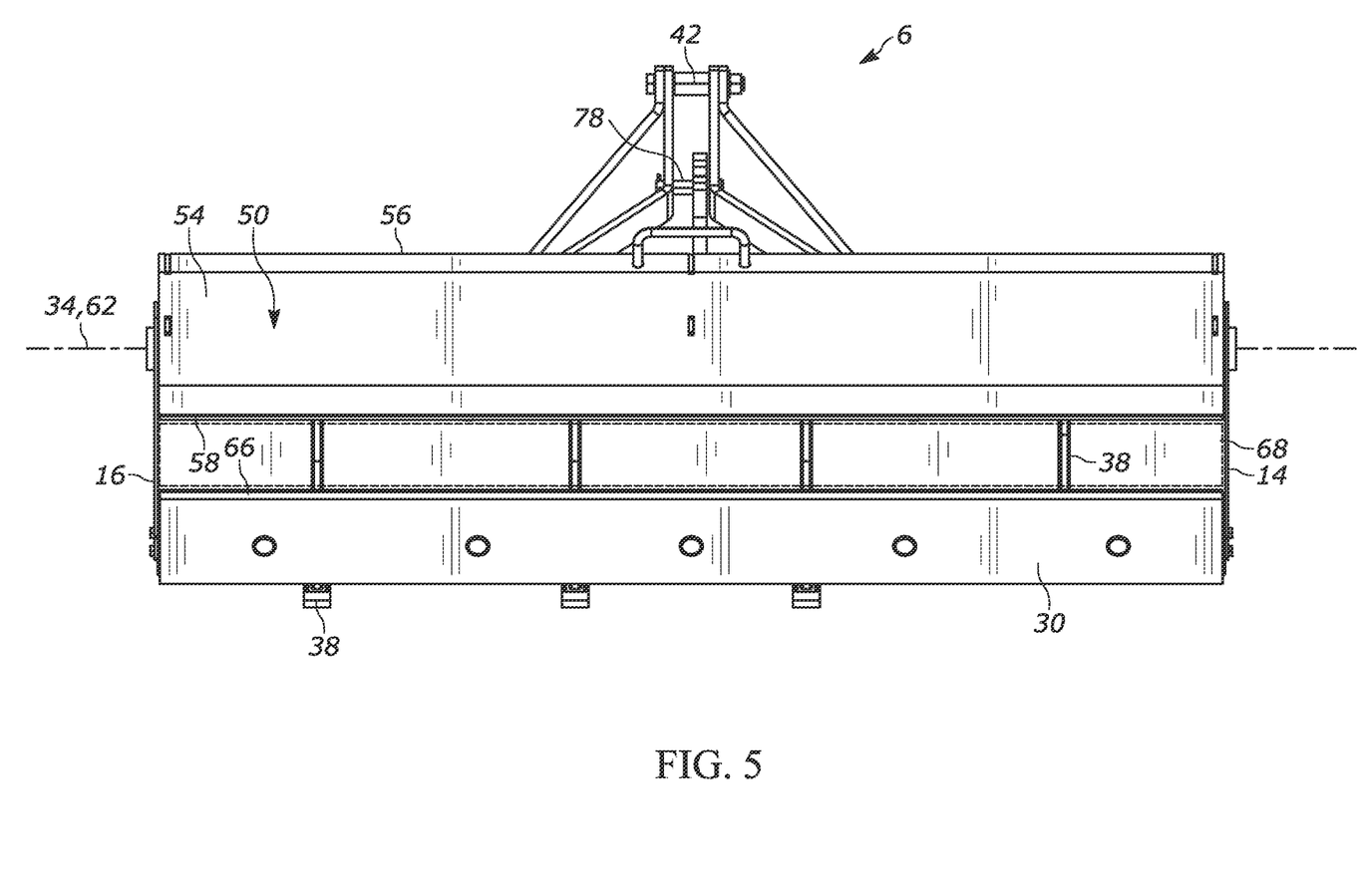
FIG. 5 is a rear view of the apparatus of FIG. 1.
Figure 6:
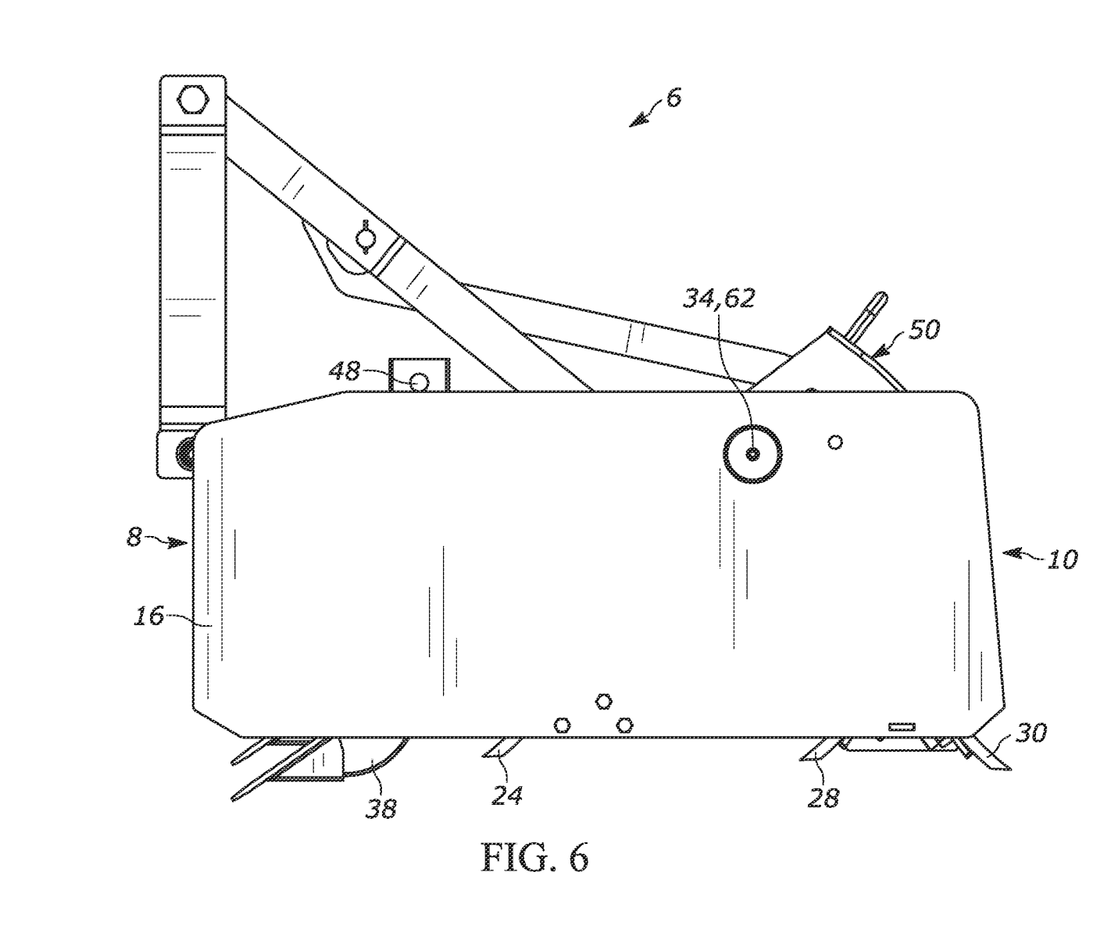
FIG. 6 is a side view of the apparatus of FIG. 1.
Figure 7:
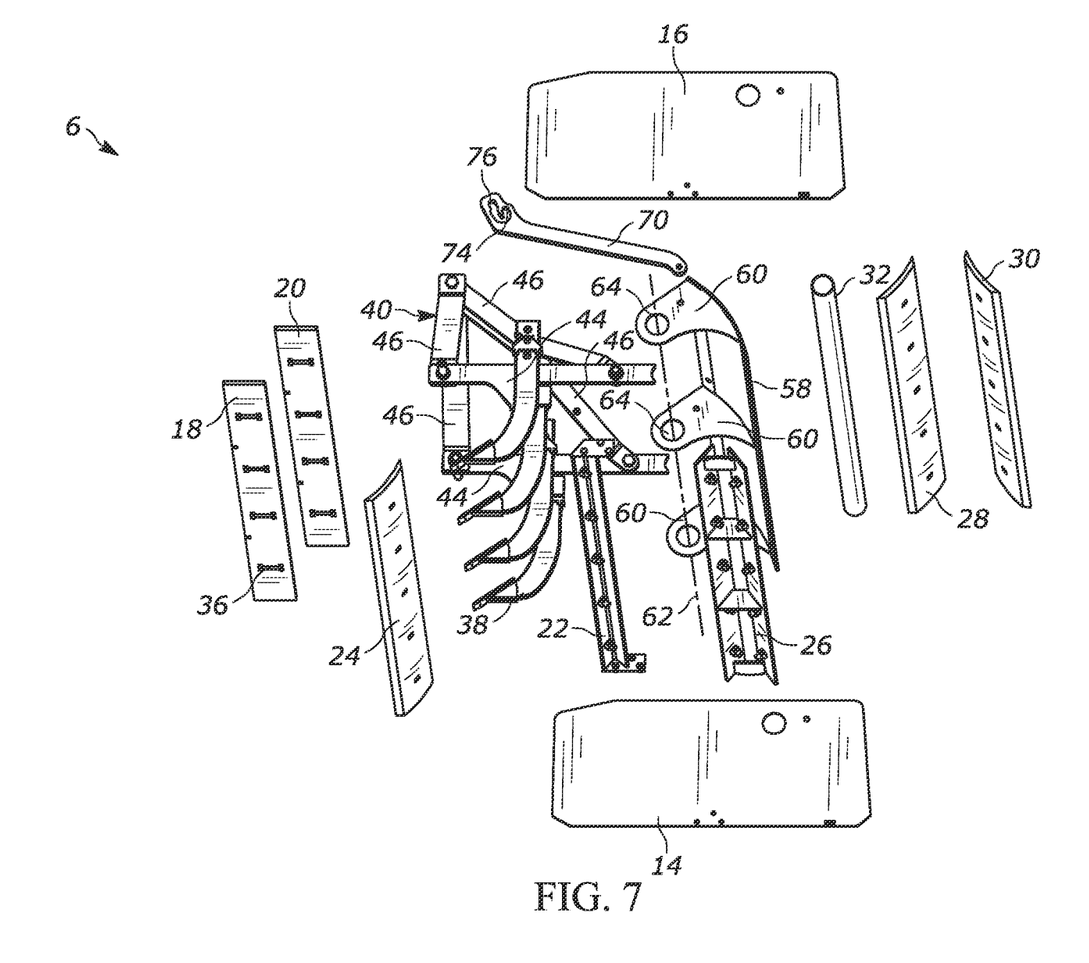
FIG. 7 is an exploded of the apparatus of FIG. 1.
Figure 8:
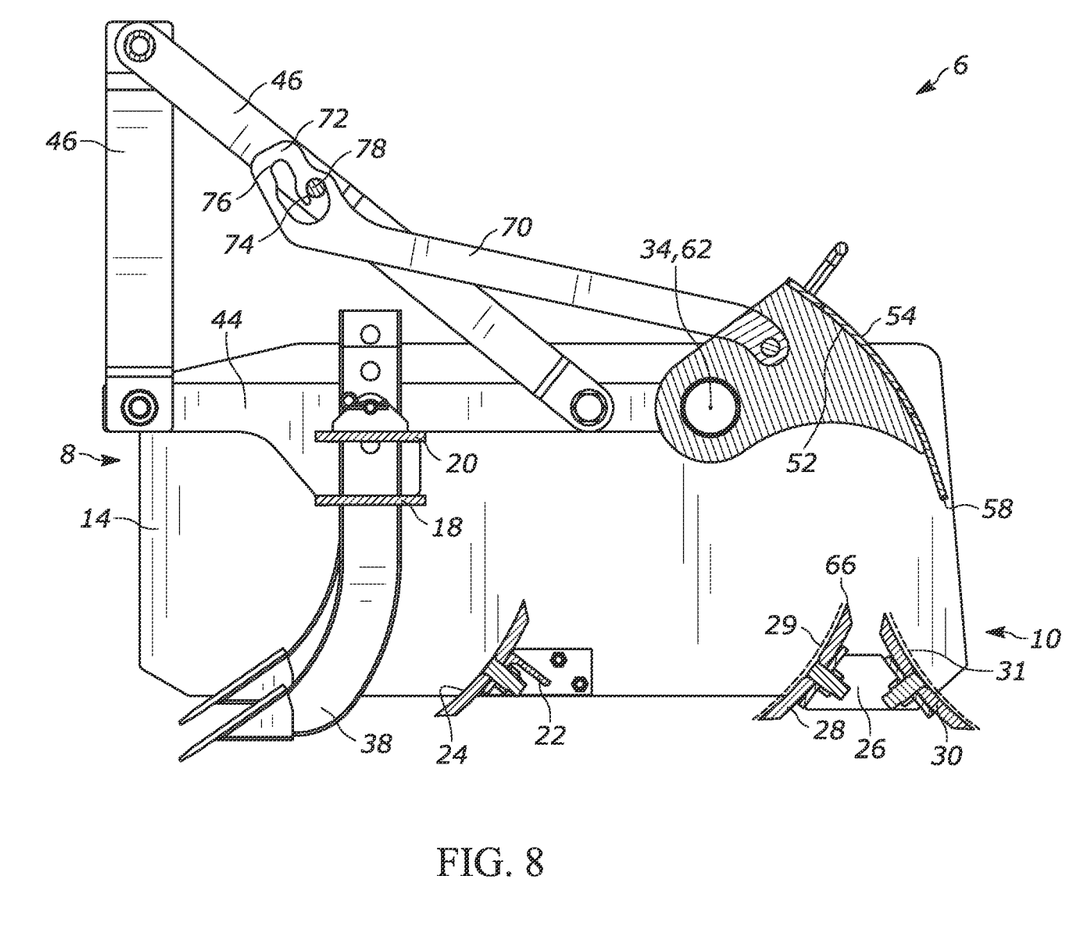
FIG. 8 is a cross-sectional view of the apparatus taken along line 8-8 of FIG. 4.
Figure 9:
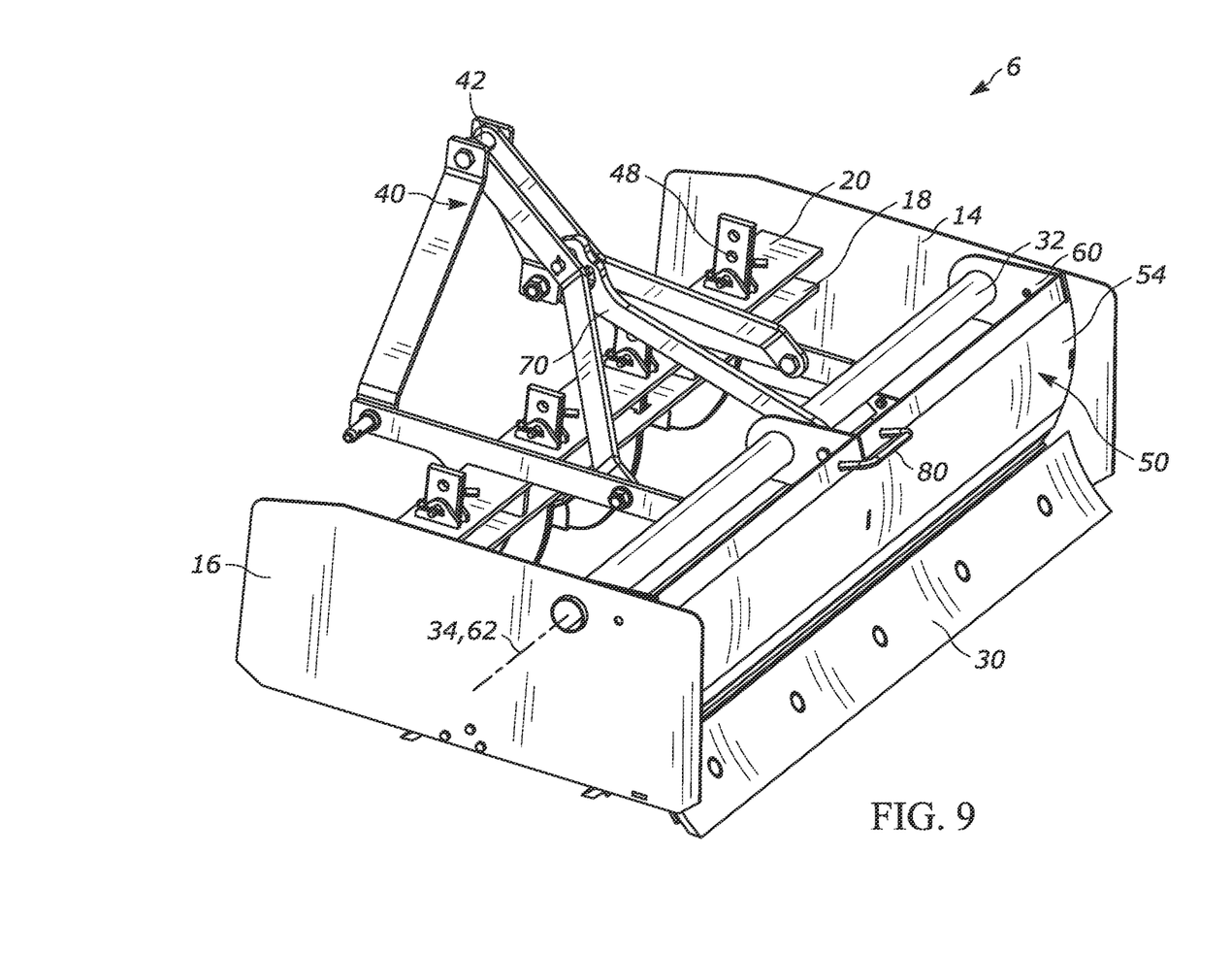
FIG. 9 is a front top perspective view of the apparatus of FIG. 1 with the moldboard shown in a down position.
Figure 10:
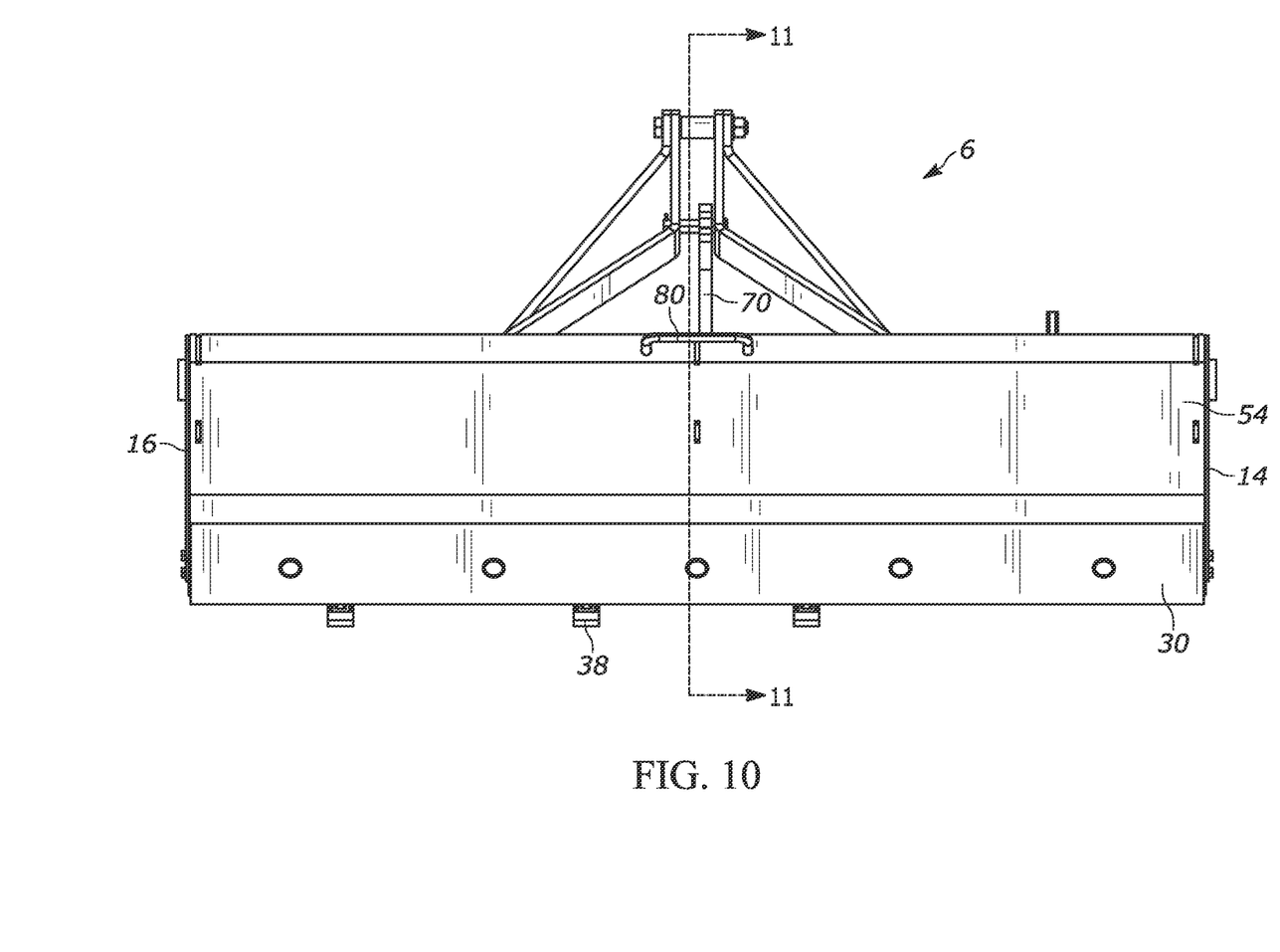
FIG. 10 is a rear view of the apparatus of FIG. 9.
Figure 11:
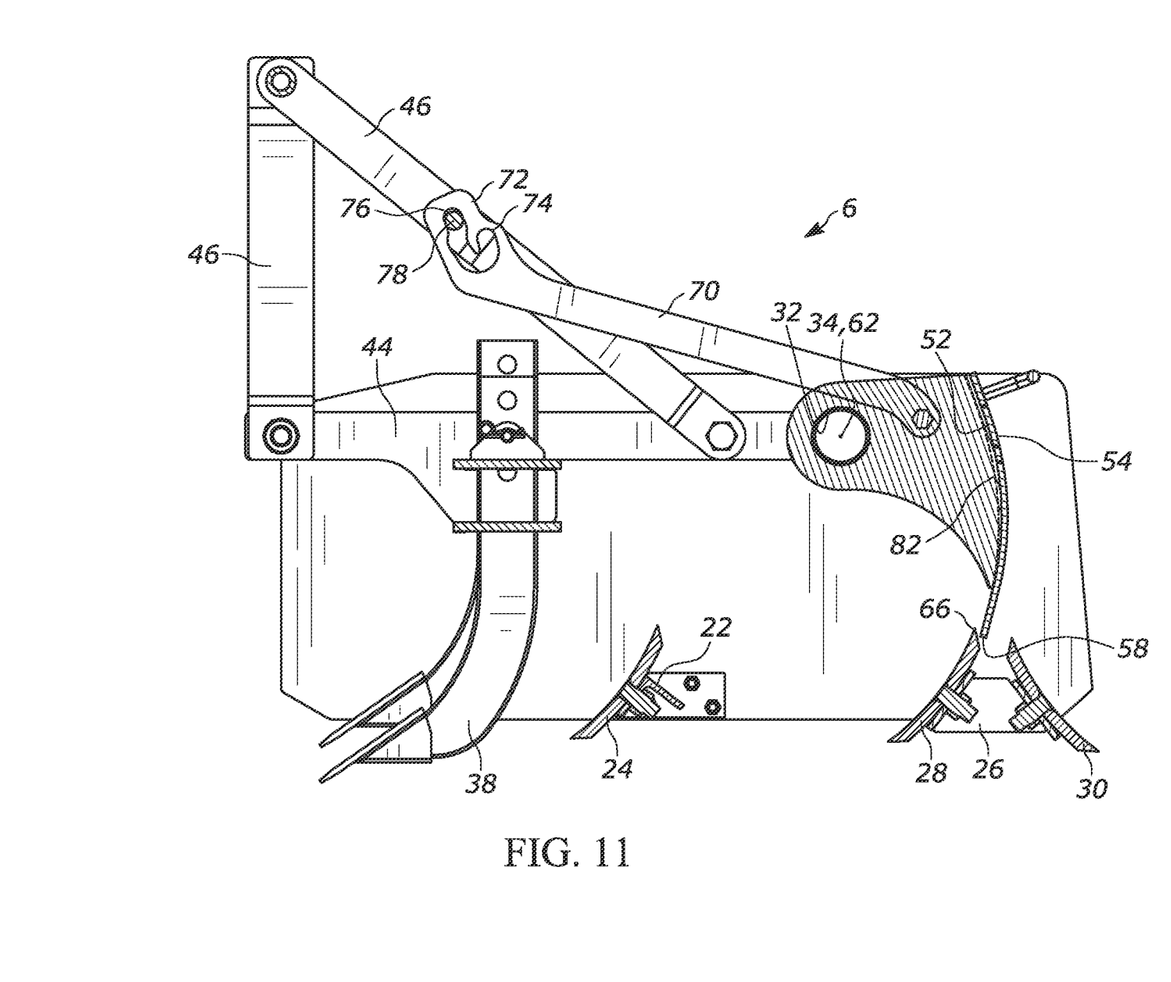
FIG. 11 is a cross-sectional view of the apparatus taken along line 11-11 of FIG. 10.

FIGS. 9-11 illustrate the moldboard 50 in the down position where the material aperture 68 is closed, with the moldboard bottom edge 58 positioned adjacent to, or in at least partial abutment with, the second scraper blade top edge 66. Various mechanisms can be utilized to raise, lower, and secure the moldboard 50 between the up and down positions. In at least some embodiments, a moldboard pivot bar 70 is provided that couples the moldboard 50 to the hitch assembly 40, wherein the moldboard pivot bar 70 can include a first end 72 with one or more spaced notches, such as a first notch 74 and a second notch 76, for engagement with a catch, such as a pin 78, on the hitch assembly 40 for selectably securing the moldboard 50 in the up or down position. As shown in FIGS. 8 and 11, when the first notch 74 is engaged with the pin 78, the moldboard 50 is held in the up position, and when the second notch 76 is engaged with the pin 78, the moldboard 50 is held in the down position. The moldboard 50 can include a handled 80 to assist with lifting and lowering.

When the moldboard 50 is in the up position, at least some of the material collected by the apparatus 6 as it is pulled along a surface, is allowed to exit the rear portion 10 of the apparatus 6 via the material aperture 68, allowing the apparatus 6 to function at least in part, similar to a grading scraper. In contrast, when the moldboard 50 is in the down position, the material aperture 68 is closed, allowing the apparatus 6 to function at least in part, similar to a box blade. As noted above, the moldboard 50 has an arc-shaped front surface 52. As best seen in the cross-sectional view of FIG. 11, a moldboard inner curvature 82 of the front surface 52 is equal or substantially equal to the second scraper blade inner curvature 29. The effect of continuing the curvature of the second scraper blade 28 is that the material dislodged by the second scraper blade 28 is guided up the front surface 52 of the moldboard 50 and is directed towards the front portion 8 of the apparatus 6 to recirculate the material for further churning. The additional churning improves the subsequent outlay of the material as it reduces rugged texture that can cause clogging and uneven dispersion when the moldboard 50 is in the up position allowing material to flow out. Further, the addition of a third blade, the level blade 30, which faces the rear portion 10 of the apparatus 6, provides additional churning of the material to provide further processing of the material the apparatus 6 is engaged with.

Although the invention has been herein described in what is perceived to be the most practical and preferred embodiments, it is to be understood that the invention is not intended to be limited to the specific embodiments set forth above, but include modified forms of those embodiments including portions of the embodiments and combinations of elements of different embodiments as come within the scope of the following claims. Further, it is recognized that modifications may be made by one of skill in the art of the invention without departing from the spirit or intent of the invention and, therefore, the invention is to be taken as including all reasonable equivalents to the subject matter of the appended claims and the description of the invention herein. And, although certain advantages of different embodiments and disadvantages of certain prior art are described, no single claim must realize every or any benefit or overcome every or any disadvantage. The term "plurality" as used herein shall be understood to include one or more.

I claim:

1. A convertible box blade scraper apparatus comprising:
   a frame assembly having a front portion and a rear portion, the frame assembly comprising:
      a first sidewall;
      a second sidewall;
      one or more shank support cross-members extending between and secured to the first sidewall and second sidewall;
      a first blade support cross-member extending between and secured to the first sidewall and the second sidewall, and having a first scraper blade secured thereto;
      a second blade support cross-member extending between and secured to the first sidewall and the second sidewall, and having both a second scraper blade with a second scraper blade top edge and a leveling blade secured thereto; and a moldboard support cross-member extending between and secured to the first sidewall and the second sidewall, the moldboard support cross-member having a moldboard support longitudinal center axis;

an elongated moldboard having an arc-shaped front surface that extends between a moldboard top edge and a moldboard bottom edge, the moldboard situated between the first sidewall and the second sidewall and including one or more pivot arms that extend from the front surface of the moldboard, the pivot arms rotatably coupled to the moldboard support cross-member to provide the moldboard with a pivot axis, wherein the front surface faces the pivot axis and the pivot axis is coincident with the moldboard support longitudinal center axis, and wherein the moldboard is selectably pivotable between an up position and a down position, and when the moldboard is in the up position a material aperture is provided between the moldboard bottom edge, the second scraper blade top edge, the first sidewall, and the second sidewall, for materials to pass therethrough, and when the moldboard is in the down position, the material aperture is substantially closed; and a hitch assembly secured to the frame assembly.

2. The apparatus of claim 1, wherein the second scraper blade includes a second scraper blade inner curvature that faces the front portion, and the leveling blade includes a leveling blade inner curvature that faces the rear portion.

3. The apparatus of claim 2, wherein the first blade support cross-member, the second blade support cross-member, and the moldboard support cross-member each extend perpendicularly from the first sidewall.

4. The apparatus of claim 2, wherein the first sidewall and the second sidewall are parallel to each other and perpendicular to each of the first blade support cross-member, the second blade support cross-member, and the moldboard support cross-member.

5. The apparatus of claim 4, further comprising a moldboard pivot bar coupling the moldboard to the hitch assembly, wherein the moldboard pivot bar includes a first end with a first notch for engagement with a pin on the hitch assembly for selectably securing the moldboard in the up position.

6. The apparatus of claim 5, wherein the moldboard pivot bar includes a second notch for engagement with the pin on the hitch assembly for selectably securing the moldboard in the down position.

7. The apparatus of claim 6, wherein the one or more shank support cross-members include a lower shank support cross-member positioned underneath an upper shank support cross-member.

8. The apparatus of claim 7, wherein the lower shank support cross-member and upper shank support cross-member are planar and include slots vertically aligned therebetween.

9. The apparatus of claim 8, wherein the pivot arms each include a circular aperture that encircles the moldboard support cross-member.

10. The apparatus of claim 9, further comprising a moldboard handle secured to the rear surface of the moldboard.

11. The apparatus of claim 10, wherein the first scraper blade is substantially parallel with the second scraper blade.

12. The apparatus of claim 8, wherein one or more shanks are inserted in the slots of the lower shank support cross-member and upper shank support cross-member.

13. The apparatus of claim 1, wherein the second scraper blade includes a second scraper blade inner curvature, and the moldboard has a moldboard inner curvature along the front surface that is substantially equal to the second scraper blade inner curvature.

* * * * *